US012241404B2

(12) United States Patent
Usui

(10) Patent No.: US 12,241,404 B2
(45) Date of Patent: Mar. 4, 2025

(54) DIAGNOSING A SUPERCHARGER OFF OF GENERATED PRESSURE

(71) Applicant: ISUZU MOTORS LIMITED, Tokyo (JP)

(72) Inventor: Toshiyuki Usui, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 174 days.

(21) Appl. No.: 17/802,884

(22) PCT Filed: Feb. 25, 2021

(86) PCT No.: PCT/JP2021/007190
§ 371 (c)(1),
(2) Date: Aug. 26, 2022

(87) PCT Pub. No.: WO2021/172467
PCT Pub. Date: Sep. 2, 2021

(65) Prior Publication Data
US 2023/0100198 A1    Mar. 30, 2023

(30) Foreign Application Priority Data
Feb. 28, 2020   (JP) ................................ 2020-033207

(51) Int. Cl.
*G07C 5/08*       (2006.01)
*F02B 39/16*      (2006.01)
(Continued)

(52) U.S. Cl.
CPC ............. *F02B 39/16* (2013.01); *G01M 15/05* (2013.01); *F02D 41/0007* (2013.01); *G07C 5/008* (2013.01)

(58) Field of Classification Search
CPC .... F02B 39/16; G01M 15/05; F02D 41/0007; G07C 5/008
See application file for complete search history.

(56) References Cited

U.S. PATENT DOCUMENTS 7,353,699 B2* 4/2008 Rollinger ................ F02B 39/16
73/114.37
7,748,366 B2* 7/2010 Rollinger ................ F02B 39/12
123/559.3
(Continued)

FOREIGN PATENT DOCUMENTS

JP       2005-248952 A     9/2005
JP       2005-351129 A    12/2005
(Continued)

OTHER PUBLICATIONS

Patent Cooperation Treaty, International Search Report, Application No. PCT/JP2021/007190, dated Apr. 13, 2021, in 7 pages.
(Continued)

*Primary Examiner* — Gonzalo Laguarda
(74) *Attorney, Agent, or Firm* — PROCOPIO, CORY, HARGREAVES & SAVITCH LLP

(57) ABSTRACT

A management device 100 comprises: a data acquisition unit 122 that acquires, from a plurality of vehicles 1, cumulative data for each parameter relating to stress acting on a compressor 33 for supercharging intake air delivered to an engine, and supercharging pressure exerted by the compressor 33; a damage degree specification unit 123 that specifies the degree of damage of a supercharging device 32 from the acquired cumulative data; a relationship specification unit 24 that specifies a relational expression indicating the relationship between the specified degree of damage and the supercharging pressure; a target information acquisition unit 125 that acquires the supercharging pressure exerted by the compressor 33 from a vehicle 1 to be diagnosed; and a diagnostic unit 126 that estimates the degree of damage of the compressor 33 to be diagnosed on the basis of the acquired supercharging pressure and the specified relational expression.

5 Claims, 5 Drawing Sheets

(51) Int. Cl.
 *G01M 15/05* (2006.01)
 *F02D 41/00* (2006.01)
 *G07C 5/00* (2006.01)

(56) References Cited

U.S. PATENT DOCUMENTS

| | | |
|---|---|---|
| 11,203,955 B2 * | 12/2021 | Osada .................. F01M 13/021 |
| 2005/0193810 A1 | 9/2005 | Gladden |
| 2005/0274112 A1 | 12/2005 | Matsumoto et al. |
| 2016/0237936 A1 | 8/2016 | Matsuo |
| 2016/0312688 A1 | 10/2016 | Matsuo et al. |
| 2018/0229744 A1 * | 8/2018 | Manzari .................. F01M 11/10 |

FOREIGN PATENT DOCUMENTS

| | | |
|---|---|---|
| JP | 2009-108680 A | 5/2009 |
| JP | 2015-108331 A | 6/2015 |
| JP | 2015-108333 A | 6/2015 |
| JP | 2015-129488 A | 7/2015 |
| JP | 2016-194278 A | 11/2016 |
| JP | 2019-190435 A | 10/2019 |
| WO | 2016-151810 A1 | 9/2016 |

OTHER PUBLICATIONS

Patent Cooperation Treaty, WOSA, Application No. PCT/JP2021/007190, dated Apr. 13, 2021, in 4 pages.

\* cited by examiner

DIAGNOSING A SUPERCHARGER OFF OF GENERATED PRESSURE

CROSS-REFERENCE TO RELATED APPLICATIONS

This application is US National Stage of International Patent Application PCT/JP2021/007190, filed Feb. 25, 2021, which claims benefit of priority from Chinese Patent Application JP2020-033207, filed Feb. 28, 2020, the contents of both of which are incorporated herein by reference.

TECHNICAL FIELD

The present disclosure relates to a diagnosis device and a diagnosis method.

BACKGROUND ART

Some internal combustion engines are provided with a supercharging device that forcibly increases an amount of intake air into a cylinder. The supercharging device includes a compressor that compresses the intake air, and fins of the compressor rotate to supercharge the intake air.

CITATION LIST

Patent Literature

Patent Literature 1: JP-A-2016-194278

SUMMARY OF INVENTION

Technical Problem

Oil such as engine oil may be contained in the intake air. In this case, the oil adheres to a housing and the fins of the compressor, and damage such as burn-in (so-called coking) occurs. When damage such as burn-in occurs, a supercharging pressure drops, and supercharging efficiency deteriorates. Therefore, it is required to appropriately estimate a degree of damage to the supercharging device and perform maintenance or the like.

The present disclosure has been made in view of these points, and an object of the present disclosure is to appropriately estimate a degree of damage to a supercharging device.

Solution to Problem

A first aspect of the present disclosure provides a diagnosis device. The diagnosis device includes: an acquisition unit configured to acquire, from a plurality of internal combustion engine devices, cumulative data for each parameter related to stress acting on a supercharging device configured to supercharge intake air to an internal combustion engine and a supercharging pressure of the supercharging device; a damage degree identification unit configured to identify a degree of damage to the supercharging device based on the acquired cumulative data; a relationship identification unit configured to identify a relational expression indicating a relationship between the identified degree of damage and the supercharging pressure; a supercharging pressure acquisition unit configured to acquire the supercharging pressure of the supercharging device from a target device which is an internal combustion engine device to be diagnosed; and an estimation unit configured to estimate a degree of damage to the supercharging device of the target device based on the supercharging pressure of the target device acquired by the supercharging pressure acquisition unit and the relational expression identified by the relationship identification unit.

The damage degree identification unit may identify a degree of coking which is burn-in in the supercharging device.

The damage degree identification unit may identify the degree of damage to the supercharging device due to blow-by gas recirculated to the intake air.

The damage degree identification unit may identify the degree of damage according to cumulative data of each of a plurality of stress factors deteriorating the supercharging device.

A second aspect of the present disclosure provides a diagnosis method. The diagnosis method includes: a step of acquiring, from a plurality of internal combustion engine devices, cumulative data for each parameter related to stress acting on a supercharging device configured to supercharge intake air to an internal combustion engine and a supercharging pressure of the supercharging device; a step of identifying a degree of damage to the supercharging device based on the acquired cumulative data; a step of identifying a relational expression indicating a relationship between the identified degree of damage and the supercharging pressure; a step of acquiring the supercharging pressure of the supercharging device from a target device which is an internal combustion engine device to be diagnosed; and a step of estimating a degree of damage to the supercharging device of the target device based on the acquired supercharging pressure of the target device and the identified relational expression.

Advantageous Effects of Invention

According to the present disclosure, it is possible to appropriately estimate a degree of damage to a supercharging device.

DESCRIPTION OF EMBODIMENTS

<Overview of Vehicle Management System>

An overview of a vehicle management system according to an embodiment will be described with reference to FIG. 1.

Figure 1:
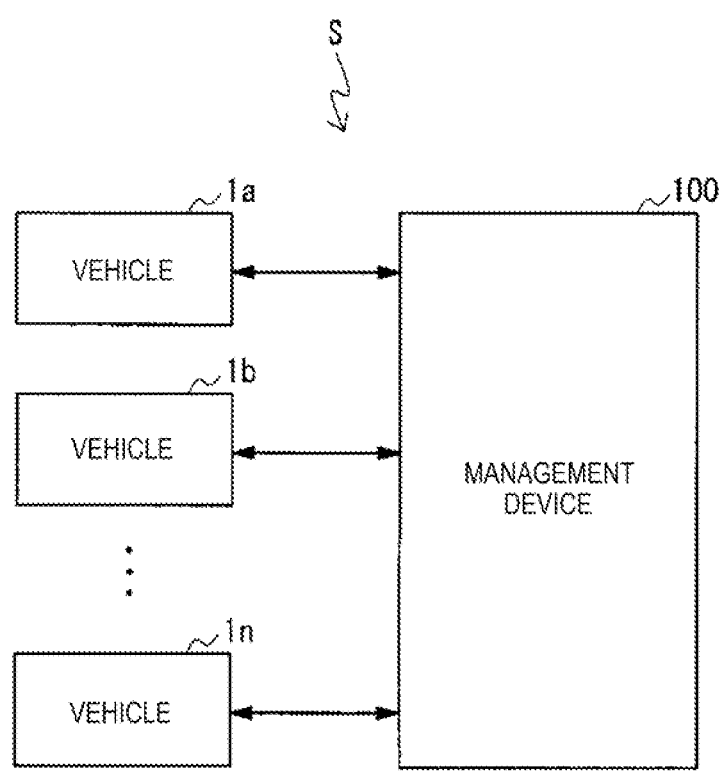
FIG. 1 is a schematic diagram showing an overview of a vehicle management system S.

FIG. 1 is a schematic diagram showing an overview of a vehicle management system S. The vehicle management system S is a system configured to manage states of a plurality of vehicles 1a, 1b, . . . , 1n (hereinafter, also collectively referred to as "vehicles 1") by operating a management device 100 and the vehicles 1 in cooperation with each other.

The plurality of vehicles 1 are, for example, trucks. The vehicle 1 corresponds to an internal combustion engine device including an engine which is an internal combustion engine. The vehicle 1 is provided with a sensor or the like configured to measure a state of the own vehicle, and transmits measured data to the management device 100.

The management device 100 is a vehicle management device capable of communicating with the plurality of vehicles 1 and configured to manage the vehicles 1. The management device 100 is, for example, a server provided in a management center. The management device 100 receives data (such as cumulative data to be described later) from each vehicle 1. The management device 100 diagnoses the state of the vehicle 1 using the received data. For example, the management device 100 determines whether maintenance is necessary based on a diagnosis result.

<Configuration of Vehicle>

Configurations of the plurality of vehicles 1a, 1b, . . . , 1n shown in FIG. 1 are the same. The configuration of the vehicle 1 will be described with reference to FIG. 2. Hereinafter, a configuration related to the diagnosis of the vehicle 1 will be described.

Figure 2:
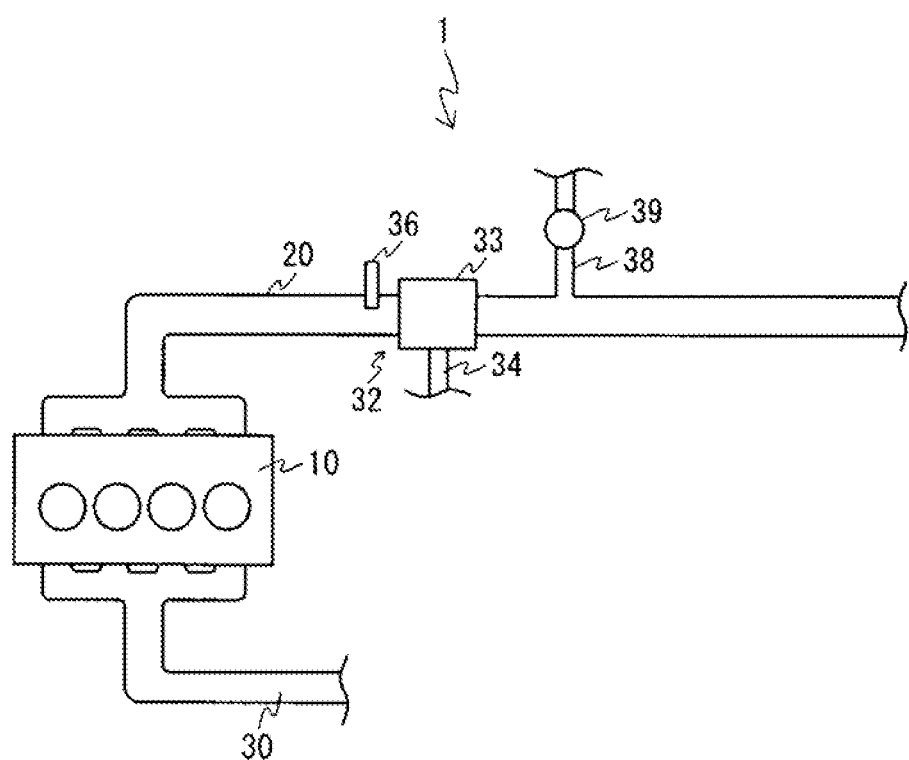
FIG. 2 is a schematic diagram showing a configuration of a vehicle 1.

FIG. 2 is a schematic diagram showing the configuration of the vehicle 1. As shown in FIG. 2, the vehicle 1 includes an engine 10, an intake passage 20, an exhaust passage 30, a supercharging device 32, a pressure sensor 36, and a positive crankcase ventilation (PCV) passage 38.

The engine 10 burns and expands an air-fuel mixture of fuel and intake air injected into an intake pipe or a cylinder (a combustion chamber) to generate power. In the engine 10, the intake air is suctioned into the cylinder, and exhaust gas after combustion is discharged from the cylinder.

The intake passage 20 is a passage through which the intake air flows toward the engine 10. The intake passage 20 is provided with the supercharging device 32 and the pressure sensor 36.

The exhaust passage 30 is a passage through which the exhaust gas from the engine 10 flows. The exhaust passage 30 is provided with a purification device configured to purify the exhaust gas.

The supercharging device 32 is, for example, a turbocharger. The supercharging device 32 includes a compressor 33 configured to compress intake air to increase an amount of the intake air. The compressor 33 includes fins configured to supercharge the intake air by rotating. The fins are provided in a housing of the compressor 33.

The compressor 33 is connected to a turbine (not shown) provided in the exhaust passage 30 via a connecting shaft 34. When the turbine is driven by the exhaust gas, the compressor 33 rotates to supercharge the intake air. The compressor 33 supercharges the intake air, so that a pressure of the intake air increases.

The pressure sensor 36 is configured to detect the pressure (hereinafter, also referred to as a supercharging pressure) of the intake air supercharged by the supercharging device 32. The pressure sensor 36 is provided between the supercharging device 32 and the engine 10 in the intake passage 20.

The PCV passage 38 is a passage configured to recirculate blow-by gas of the engine 10 to the intake passage 20. The PCV passage 38 connects the engine 10 and the intake passage 20 (specifically, upstream of the compressor 33 in the intake passage 20). The PCV passage 38 is provided with a pump 39 configured to perform pumping from an engine 10 side to an intake passage 20 side.

The blow-by gas is a combustion gas or unburned fuel that has leaked from a combustion chamber of the engine 10 to a crankcase. The blow-by gas causes deterioration of lubricating oil in the crankcase and deterioration of fuel efficiency. Therefore, after the blow-by gas has been recirculated to the intake passage 20, the blow-by gas is burned again in the combustion chamber of the engine 10.

Oil such as engine oil may be contained in the intake air flowing through the intake passage 20. For example, since mist-shaped oil is contained in the blow-by gas, when the blow-by gas is recirculated from the PCV passage 38 to the intake passage 20, the oil is contained in the intake air. In this case, the oil adheres to the compressor 33 (specifically, the housing or the fins of the compressor 33) of the supercharging device 32, and damage of coking occurs. When coking occurs, the supercharging pressure drops, and the supercharging efficiency of the compressor 33 deteriorates.

On the other hand, the management device 100 acquires cumulative data indicating operation states from the plurality of vehicles 1, and obtains a relational expression between the degree of damage to the compressor 33 and a characteristic value (specifically, the supercharging pressure) for identifying the damage. Then, the management device 100 estimates the degree of damage to the compressor 33 of the vehicle 1 to be diagnosed based on the relational expression obtained in advance and a supercharging pressure acquired from the vehicle 1 to be diagnosed. Accordingly, it is possible to appropriately estimate the degree of damage to the compressor 33 of the vehicle 1 to be diagnosed.

<Configuration of Management Device>

A configuration of the management device 100 that functions as a diagnosis device will be described with reference to FIG. 3.

Figure 3:
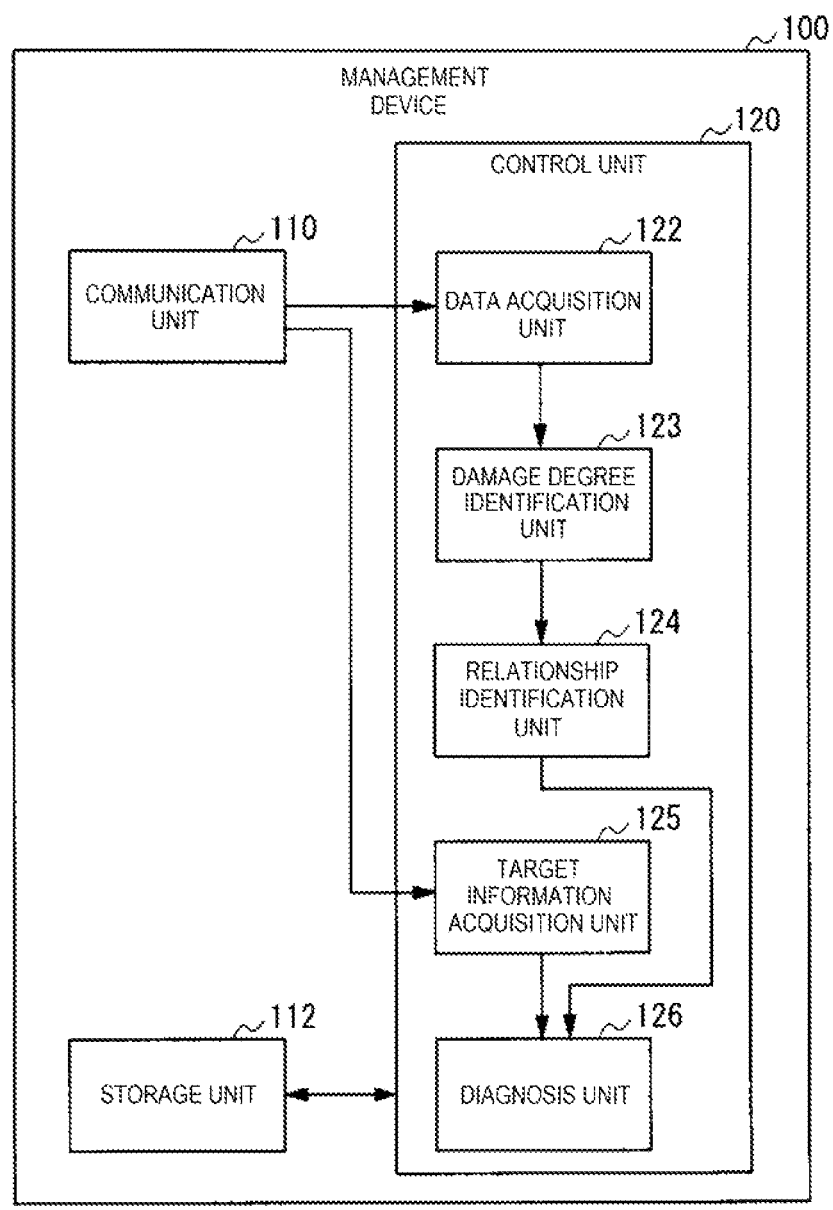
FIG. 3 is a block diagram showing a configuration of a management device 100.

FIG. 3 is a block diagram showing the configuration of the management device 100. The management device 100 is operated by an administrator of the management center. As shown in FIG. 3, the management device 100 includes a communication unit 110, a storage unit 112, and a control unit 120.

The communication unit 110 is configured to communicate with the vehicle 1 (FIG. 1). The communication unit 110 is configured to transmit and receive data to and from the vehicle 1. For example, the communication unit 110 receives the cumulative data indicating the operation state of the vehicle 1 from the vehicle 1.

The storage unit 112 includes, for example, a read only memory (ROM) and a random access memory (RAM). The storage unit 112 is configured to store a program to be executed by the control unit 120 and various types of data. For example, the storage unit 112 stores the cumulative data acquired from each of the plurality of vehicles 1. Further, the storage unit 112 is configured to store information on the relational expression of the degree of damage to the compressor 33.

The control unit 120 is, for example, a central processing unit (CPU). The control unit 120 is configured to diagnose the vehicle 1 by executing the program stored in the storage unit 112. In the present embodiment, the control unit 120 functions as a data acquisition unit 122, a damage degree identification unit 123, a relationship identification unit 124, a target information acquisition unit 125, and a diagnosis unit 126.

The data acquisition unit 122 is configured to acquire data of the vehicle 1 from the plurality of vehicles 1. In the present embodiment, the data acquisition unit 122 acquires cumulative data for each parameter related to stress acting on the supercharging device 32 (here, the compressor 33)

from the plurality of vehicles 1. By using the cumulative data, it is possible to diagnose the degree of damage to the compressor 33 that has deteriorated due to the complex stress. The data acquisition unit 122 periodically (for example, once per month) acquires the cumulative data. The data acquisition unit 122 stores the acquired cumulative data in the storage unit 112.

There are a plurality of parameters of stress factors acting on the compressor 33. For example, the parameters of the stress factors are use in an operation in which the engine oil is consumed in a large amount, use in a state in which the intake air is at a high temperature, and the like. The cumulative data indicates a frequency of each parameter.

The data acquisition unit 122 acquires the supercharging pressure of the supercharging device 32 together with the cumulative data from the plurality of vehicles 1. That is, the data acquisition unit 122 acquires the supercharging pressure during supercharging performed by the supercharging device 32. Specifically, the data acquisition unit 122 acquires the supercharging pressure detected by the pressure sensor 36 during the supercharging. The supercharging pressure is a characteristic value capable of identifying the degree of damage to the deteriorated compressor 33. Normally, when the supercharging pressure is high, the degree of damage to the compressor 33 tends to be small, and when the supercharging pressure is low, the degree of damage to the compressor 33 tends to be large.

The damage degree identification unit 123 is configured to identify the degree of damage to the supercharging device 32 (specifically, the compressor 33) of the vehicle 1. The damage degree identification unit 123 identifies the degree of damage to the compressor 33 of each vehicle 1 based on the cumulative data acquired from the plurality of vehicles 1. That is, the damage degree identification unit 123 identifies a degree of coking of the compressor 33 due to a plurality of stress factors.

The damage degree identification unit 123 identifies the degree of damage to the compressor 33 according to the cumulative data of each of the plurality of stress factors deteriorating the compressor 33. At this time, the damage degree identification unit 123 multiplies a weighting coefficient for each stress factor. Accordingly, it is possible to identify the degree of damage reflecting the plurality of stress factors.

The damage degree identification unit 123 identifies the degree of damage to the compressor 33 due to the blow-by gas recirculated to the intake air as the degree of damage.

That is, the damage degree identification unit 123 identifies the degree of damage to the compressor 33 caused by the oil in the blow-by gas recirculated to the intake passage 20 via the PCV passage 38. Specifically, the damage degree identification unit 123 identifies the degree of coking which is burn-in in the compressor 33. Accordingly, it is possible to identify a degree of progress of coking in the compressor 33.

The relationship identification unit 124 is configured to identify a relational expression indicating a relationship between the degree of damage to the supercharging device 32 and a characteristic value for identifying the damage. That is, the relationship identification unit 124 is configured to identify a relational expression indicating the relationship between the degree of damage to the compressor 33 identified by the damage degree identification unit 123 and the supercharging pressure for identifying the damage. The relationship identification unit 124 stores the identified relational expression in the storage unit 112.

Figure 4:
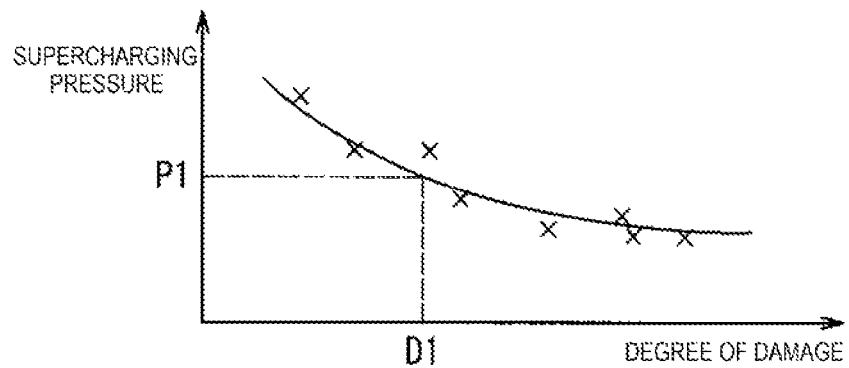
FIG. 4 is a schematic diagram showing a relational expression.

FIG. 4 is a schematic diagram showing the relational expression. In a graph in FIG. 4, a horizontal axis represents the degree of damage to the compressor 33, and a vertical axis represents the supercharging pressure which is the characteristic value. In the graph, the correspondence relationship between the degree of damage and the characteristic value based on the data periodically acquired from the one vehicle 1, which is a failed vehicle, is plotted as a x mark. A curve on the graph is an approximate line of plotted data, and indicates the relational expression. The relationship identification unit 124 may identify the relational expression by averaging the approximate lines obtained for each of the plurality of vehicles 1.

The relationship identification unit 124 may update the relational expression by machine learning. That is, the relationship is updated using the cumulative data and the supercharging pressure that are periodically acquired from the vehicle 1. Accordingly, it is possible to identify the relational expression with higher accuracy.

The target information acquisition unit 125 is configured to acquire, from the vehicle 1 to be diagnosed, information on the characteristic value (here, the supercharging pressure) for identifying the degree of damage to the compressor 33. That is, the target information acquisition unit 125 functions as a supercharging pressure acquisition unit configured to acquire the supercharging pressure of the supercharging device 32. Specifically, the target information acquisition unit 125 is configured to acquire the supercharging pressure detected by the pressure sensor 36 (FIG. 2). When the device to be diagnosed is the vehicle 1a shown in FIG. 1, the target information acquisition unit 125 acquires the supercharging pressure from the vehicle 1a. The target information acquisition unit 125 outputs information on the acquired supercharging pressure to the diagnosis unit 126.

The diagnosis unit 126 is configured to diagnose the vehicle 1 to be diagnosed. The diagnosis unit 126 functions as an estimation unit configured to estimate the degree of damage to the compressor 33 to be diagnosed based on the supercharging pressure acquired by the target information acquisition unit 125 and the relational expression identified by the relationship identification unit 124. Specifically, the diagnosis unit 126 estimates the degree of damage to the compressor 33 to be diagnosed by applying the supercharging pressure to the relational expression. For example, as shown in FIG. 4, when the supercharging pressure is P1, the diagnosis unit 126 estimates that the degree of damage is D1. Accordingly, if the supercharging pressure is known, the diagnosis unit 126 can accurately estimate the degree of damage (the degree of coking in the compressor 33) to the compressor 33 that deteriorates due to the plurality of stress factors. The diagnosis unit 126 may predict a life of the compressor 33 based on the estimated degree of damage to the compressor 33.

<Flow of Processing Executed by Management Device>

A flow of the diagnosis processing executed by the management device 100 will be described with reference to FIGS. 5 and 6.

Figure 5:
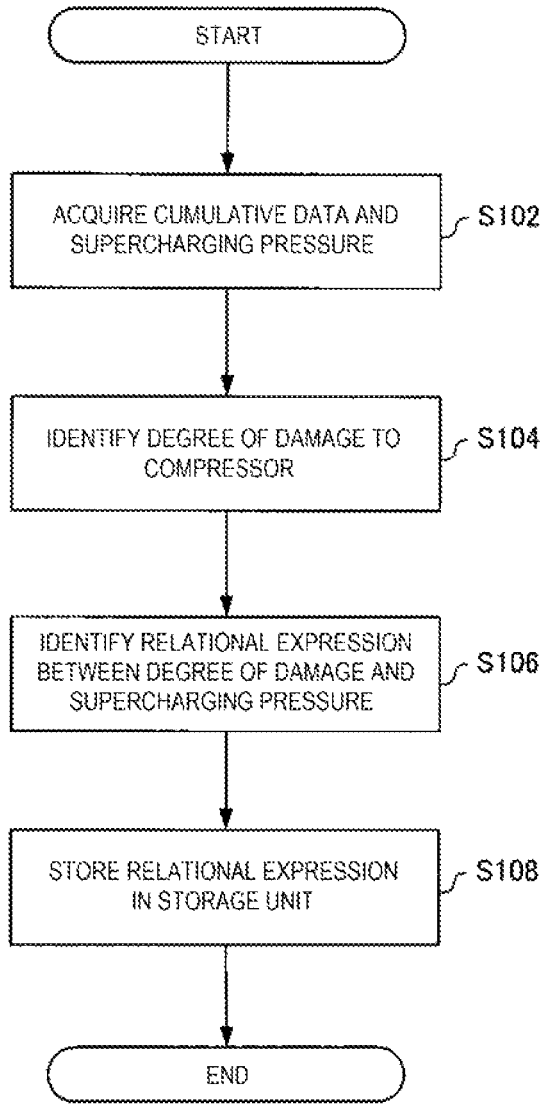
FIG. 5 is a flowchart showing a flow for identifying the relational expression.

FIG. 5 is a flowchart showing the flow for identifying the relational expression.

The data acquisition unit 122 of the management device 100 acquires the cumulative data and the supercharging pressure from the plurality of vehicles 1 (for example, the vehicles 1a to In in FIG. 1) (step S102). The data acquisition unit 122 periodically (for example, once per month) acquires the cumulative data and the supercharging pressure.

Next, the damage degree identification unit 123 identifies the degree of damage to the compressor 33 of each vehicle 1 based on the acquired cumulative data (step S104). That is, the damage degree identification unit 123 identifies the degree of damage to the compressor 33 that deteriorates due to the plurality of stress factors.

Next, the relationship identification unit 124 identifies the relational expression indicating the relationship between the identified degree of damage and the supercharging pressure (step S106). For example, the relationship identification unit 124 identifies the relational expression indicated by an approximate expression shown in FIG. 4.

Next, the relationship identification unit 124 stores the identified relational expression in the storage unit 112 (step S108). By repeating the above-described processing, the relational expression stored in the storage unit 112 is updated. Accordingly, the relational expression with high accuracy can be stored.

Figure 6:
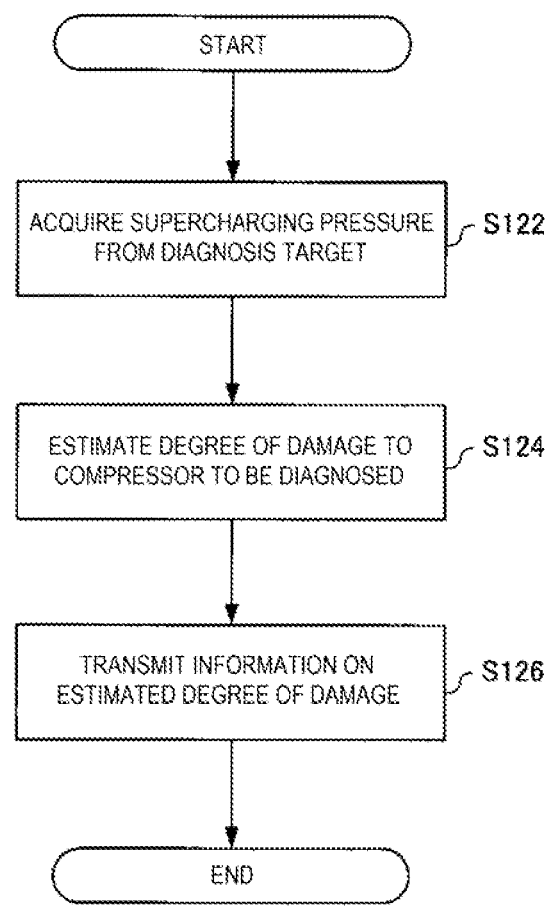
FIG. 6 is a flowchart showing estimation processing of a degree of damage to a diagnosis target.

FIG. 6 is a flowchart showing estimation processing of the degree of damage to a diagnosis target.

Here, the target information acquisition unit 125 of the management device 100 starts from the acquisition of the supercharging pressure from the vehicle 1 to be diagnosed (step S122). Specifically, the target information acquisition unit 125 acquires the supercharging pressure detected by the pressure sensor 36.

Next, the diagnosis unit 126 estimates the degree of damage to the compressor 33 of the vehicle 1 to be diagnosed based on the supercharging pressure acquired in step S122 and the relational expression stored in advance in the storage unit 112 (step S124). For example, the diagnosis unit 126 can accurately estimate the degree of damage to the compressor 33 by obtaining the degree of damage corresponding to the supercharging pressure based on the relational expression shown in FIG. 4.

Next, the management device 100 transmits the information on the estimated degree of damage (step S126). For example, the management device 100 transmits the information on the degree of damage to a maintenance factory.

Effects According to Present Embodiment

The management device 100 according to the above-described embodiment identifies the relational expression between the degree of damage to the compressor 33 and the supercharging pressure using the cumulative data acquired from the plurality of vehicles 1.

When the management device 100 acquires the supercharging pressure from the vehicle 1 to be diagnosed, the management device 100 estimates the degree of damage to the compressor 33 of the vehicle 1 to be diagnosed based on the correspondence relationship with the relational expression identified in advance.

Accordingly, by applying the supercharging pressure of the compressor 33 to be diagnosed to the relational expression, it is possible to appropriately estimate the degree of damage (specifically, the degree of progress of coking) to the compressor 33 that deteriorates due to the plurality of stress factors. As a result, it is possible to appropriately perform maintenance of the compressor 33 or the like by providing the information on the estimated degree of damage to the maintenance factory.

Although the present disclosure has been described above using the embodiment, the technical scope of the present disclosure is not limited to the scope described in the above-described embodiment, and various modifications and changes can be made within the scope of the gist of the present disclosure. For example, all or a part of the devices can be functionally or physically distributed or integrated in any unit. Further, a new embodiment generated by any combination of a plurality of embodiments is also contained in the embodiment of the present disclosure. Effects according to the new embodiment obtained by the combination include effects according to the original embodiments.

The present application is based on the Japanese Patent Application No. 2020-033207 filed on Feb. 28, 2020, and contents thereof are incorporated herein as reference.

INDUSTRIAL APPLICABILITY

The diagnosis device and the diagnosis method according to the present disclosure are useful in that the degree of damage to the supercharging device can be appropriately estimated.

REFERENCE SIGNS LIST

1 vehicle
10 engine
32 supercharging device
33 compressor
100 management device (diagnosis device)
122 data acquisition unit
123 damage degree identification unit
124 relationship identification unit
125 target information acquisition unit
126 diagnosis unit

The invention claimed is:

1. A diagnosis device comprising:
   a communication unit configured to communicate with a plurality of vehicles each including an internal combustion engine and a supercharger;
   an acquisition unit configured to acquire, through the communication unit from each of the plurality of vehicles, cumulative data for each parameter related to stress acting on the supercharger configured to supercharge intake air to the internal combustion engine and a supercharging pressure of the supercharger;
   a damage degree identification unit configured to identify a degree of damage to the supercharger of each of the plurality of vehicles based on the acquired cumulative data;
   a relationship identification unit configured to identify a relational expression indicating a relationship between the identified degree of damage and the supercharging pressure;
   a supercharging pressure acquisition unit configured to acquire the supercharging pressure of the supercharger through the communication unit from a target vehicle to be diagnosed which is included in the plurality of vehicles; and
   an estimation unit configured to estimate a degree of damage to the supercharger of the target vehicle based on the supercharging pressure of the target vehicle acquired by the supercharging pressure acquisition unit and the relational expression identified by the relationship identification unit,
   wherein the cumulative data indicates a frequency of each parameter including at least one of use in an operation in which an engine oil is consumed in a large amount and use in a state in which the intake air is at a high temperature.

2. The diagnosis device according to claim 1, wherein the damage degree identification unit identifies a degree of coking which is burn-in in the supercharging device.

3. The diagnosis device according to claim 1,
wherein the damage degree identification unit identifies the degree of damage to the supercharger due to blow-by gas recirculated to the intake air.

4. The diagnosis device according to claim 1,
wherein the damage degree identification unit identifies the degree of damage according to cumulative data of each of a plurality of stress factors deteriorating the supercharger.

5. A diagnosis method comprising:
a step of acquiring, from a plurality of vehicles each including an internal combustion engine and a supercharger, cumulative data for each parameter related to stress acting on the supercharger configured to supercharge intake air to the internal combustion engine and a supercharging pressure of the supercharger;

a step of identifying a degree of damage to the supercharger of each of the plurality of vehicles based on the acquired cumulative data;

a step of identifying a relational expression indicating a relationship between the identified degree of damage and the supercharging pressure;

a step of acquiring the supercharging pressure of the supercharger from a target vehicle to be diagnosed which is included in the plurality of vehicles; and a step of estimating a degree of damage to the supercharger of the target vehicle based on the acquired supercharging pressure of the target vehicle and the identified relational expression, wherein the cumulative data indicates a frequency of each parameter including at least one of use in an operation in which an engine oil is consumed in a large amount and use in a state in which the intake air is at a high temperature.

\* \* \* \* \*